United States Patent [19]

Reeve

[11] Patent Number: 4,604,368
[45] Date of Patent: Aug. 5, 1986

[54] METHOD OF PRODUCING AN ALUMINIUM BORIDE
[75] Inventor: Martin R. Reeve, Beaconsfield, Canada
[73] Assignee: Alcan International Limited, Montreal, Canada
[21] Appl. No.: 622,104
[22] Filed: Jun. 19, 1984
[30] Foreign Application Priority Data
Jun. 24, 1983 [GB] United Kingdom ............... 8317243
[51] Int. Cl.$^4$ .............................................. C04B 35/58
[52] U.S. Cl. ...................................... 501/98; 501/96; 75/63; 423/289
[58] Field of Search :.................. 501/96, 98; 423/289; 75/63, 68 R; 428/689, 697, 698; 427/294, 376.1
[56] References Cited
U.S. PATENT DOCUMENTS
3,198,625  7/1965  Stroup ..................................... 75/68

FOREIGN PATENT DOCUMENTS
0099948  8/1984  European Pat. Off. .
55-154313  12/1980  Japan .................................. 423/289

Primary Examiner—William R. Dixon, Jr.
Assistant Examiner—Karl Group
Attorney, Agent, or Firm—Cooper, Dunham, Clark, Griffin & Moran

[57] ABSTRACT

A method of producing an aluminum boride (AlB$_2$ or AlB$_{12}$) in solid form comprises providing a body of molten aluminum containing suspended particles of an aluminum boride, and separating the particles e.g. by filtration from the bulk of the molten metal. Preferred filter media are alumina and carbon, each of which can be subsequently removed to leave the aluminum boride in solid form. The product is a useful precursor for production by reaction sintering of refractory composites containing titanium diboride.

7 Claims, No Drawings

METHOD OF PRODUCING AN ALUMINIUM BORIDE

This invention relates to a method of producing an aluminium boride. The term aluminium boride includes aluminium diboride $AlB_2$ and aluminium dodecaboride $AlB_{12}$, both of which are potentially useful precursors for production by reaction sintering of refractory composites containing titanium diboride $TiB_2$. Examples of reaction based on $AlB_2$ and $AlB_{12}$ which have been reported include the following:

1. $TiN + AlB_2{}_{/\,=TiB2} + AlN$ for production of $TiB_2$/AlN composite.
2. $TiH_2 + AlB_2 = TiB_2 + Al + H_2$ for production of $TiB_2$/Al composite.
3. $3TiH_2 + AlB_2 + \frac{1}{3}\,AlB_{12} = 3TiB_2 + 4/3$ Al for production of $TiB_2$/Al composite.

However, efforts to develop a commercially viable method for manufacture of $TiB_2$ - containing materials based on reactions such as the above are handicapped by the restricted commercial availability and consequent high price of $AlB_2$ and $ALB_{12}$. The proposed method of the present invention is intended to produce these materials at lower cost using commercially available raw materials and, as far as possible, production processes in common industrial use.

According to the present invention there is provided a method of producing an aluminium boride in solid form, which method comprises providing a body of molten aluminium containing suspended particles of an aluminium boride, separating the particles from the bulk of the molten metal, and recovering the aluminium boride in solid form.

Aluminium-boron alloys are commercially available, and can simply be heated to provide the desired starting body of molten aluminium containing suspended particles of an aluminium boride. The industrial process for manufacturing aluminium-boron alloys uses a coreless induction furnace, mains frequency being preferred. A predetermined quantity of potassium borofluoride $KBF_4$ powder is fed via a screw feeder or other suitable device on to the surface of the molten Al whilst supplying power to the induction coils to stir the melt. Boron (B) contents of commercial alloys are usually either nominally 3% or 4% and B recovery from $KBF_4$ is typically between 80 and 90%. The temperature of the Al determines whether the boride is produced as $AlB_2$, which is the low temperature phase, or $AlB_{12}$. The transition temperature from $AlB_2$ to $AlB_{12}$ as reported in the literature used to be somewhat uncertain, e.g. Mondolfo has reported approximately 1200° K. (927° C.) whereas Willey (ASTM Metals Handbook, 1973) reported approximately 1350° C. The experience of master alloy manufacturers indicates the latter to be too high. $AlB_2$-containing alloys are produced at temperatures within the range 750°-850° C., typically 800°-850° C. $AlB_{12}$-containing alloys are produced at 950°-1200° C., typically 1000°-1100° C. Microstructural examination of the cast materials indicates that such alloys do not contain borides exclusively as $AlB_2$ or $AlB_{12}$ but predominantly so, i.e. 90% or more of borides are in one or other form. Particle size is typically within the range 5-50 microns, with some particles up to 100 microns.

The higher the B content the more difficult it becomes to produce a molten castable alloy at the low temperatures suitable for $AlB_2$ production, because of the rapid increase in melt viscosity. Until relatively recently no alloy containing 4% B was produced with a predominantly $AlB_2$ structure, but such an alloy is now commercially available. The maximum B content which could be introduced into aluminium, whilst still maintaining adequate fluidity even at the high temperatures quoted above with a predominantly $AlB_{12}$ structure is probably no more than 5 or 6%.

After alloying is completed the furnace is slightly tilted to pour off a molten potassium aluminium fluoride reaction product.

European Patent Specification No. 99948 A describes a method of separating high-purity aluminium, by deposition on a rotating cooling body, from a melt of aluminium containing aluminium boride. The remaining melt contains an enhanced concentration of aluminium boride, and may thus be particularly suitable for use in the second stage of the method of this invention.

The second stage of the method involves separating the suspended aluminium boride particles from the bulk of the molten metal. It may be possible to effect separation by allowing the particles to settle and then decanting the supernatant liquid, but this is likely to be time consuming. Preferably, the separation involves a filtration step in which the body of molten metal is poured into a heated filtration vessel. This may comprise an upright tapered cast iron or steel shell lined with alumina or other suitable refractory resistant to molten Al. If desired, reduced pressure can be applied on the downstream side of the filter using a vacuum pump, to draw the metal through the filter and into a receiving vessel. The metal can then, if desired, be recycled to the induction furnace for preparation of a fresh batch of the alloy.

As filter media, there may be used refractory materials which are not attacked by the Al-B alloy. Possible materials include the borides and nitrides of groups IIIb, IVb, Vb and VIb metals, particularly $TiB_2$, $AlB_2$, $AlB_{12}$, BN, TiN and AlN; and these materials may have advantages in some circumstances as described below. Preferred filter media are alumina and carbon. Either can be in the form of a plate on disc-shaped compact of porous or foamed material pervious to molten Al. However, it is preferred to provide the filter media in the form of a bed or compact of granular material. The most preferred filter medium is a plate or disc-shaped compact of pressed unbonded or lightly sintered refractory aggregate. Alternatively, the filter may comprise a bed of loose granular aggregate supported on a refractory alumina grill. The granular aggregate is preferably of a particle size to pass through a 3 mesh sieve. If the filter medium is not wetted by Al, as is the case for alumina and carbon, then the filter openings may need to be somewhat coarser, and/or a higher pressure difference may need to be applied across the filter to cause the Al to flow through it.

On completion of the pour, the filter and residue are allowed to cool and removed from the vessel.

The third stage of the method involves recovery of the aluminium boride in solid form. When the filter medium is of $TiB_2$, $AlB_2$, $AlB_{12}$, BN, TiN, AlN or similar materials, it may be possible to use the precipitated aluminium boride without separation. Thus for example a $TiB_2$ filter carrying precipitated $AlB_2$ or $AlB_{12}$ can be used for reaction with TiN or $TiH_2$ for production of a $TiB_2$/AlN or $TiB_2$/Al composite. Alternatively, a TiN filter carrying precipitated $AlB_2$ can be used directly in reaction (1) above. Filter media carrying precipitated aluminium borides may also contain residual Al metal.

The latter can if necessary be removed, e.g. by leaching with a dilute mineral acid, in order to enable the filter medium to be mixed with the other powdered reactants.

When the filter medium is alumina or carbon, it will normally be desired to recover the aluminium boride from the filter. This may be effected by dissolving the filter medium in a solvent in which the aluminium boride is insoluble.

Thus, for example, smelter grade alumina is readily attacked by mineral acids such as HCl, $HNO_3$ and $H_2SO_4$. $AlB_2$ is reported to be insoluble in $HNO_3$ and $H_2SO_4$, and these acids therefore offer a means of separating $AlB_2$ from an alumina filter medium. $AlB_{12}$ is reported to be insoluble in HCl and $H_2SO_4$, and these acids therefore offer a means of separating $AlB_{12}$ from an alumina filter medium.

$AlB_2$ is reported to be soluble in HCl, while $AlB_{12}$ is reported to be soluble in $HNO_3$. Hence, treatmemt with either HCl or $HNO_3$ offers a means for separating $AlB_2$ from $AlB_{12}$ if this is desired.

Aluminium borides can be separated from a granular carbon filter by converting the latter to methane. This may be effected by exposing the carbon to hydrogen gas at elevated temperatures in the presence of a finely divided nickel catalyst. Such a process can conveniently be effected in a controlled atmosphere horizontal tube furnace. The finely-divided metallic nickel can be subsequently separated from the aluminium borides by exposure to a stream of carbon monoxide gas which converts the former to gaseous nickel carbonyl, from which the nickel can subsequently be recovered and re-used.

Alternatively, it may be possible to separate the greater part of the $AlB_2$ from the filter medium by selective screening as the filter medium would normally be considerably coarser.

I claim:

1. A method of forming a solid mixture of particles of an aluminium boride with a refractory material selected from borides and nitrides of groups IIIb, IVb, Vb and VIb metals, which method comprises providing a body of molten aluminium containing suspended particles of an aluminium boride, physically separating said suspended particles from the bulk of the molten metal by passing the body containing the suspended particles through a filter which is pervious to the molten aluminium but which retains the suspended particles, said filter being constituted of a filter medium comprising a refractory material selected from borides and nitrides of groups IIIb, IV, Vb, and VIb metals, and thereafter recovering the filter medium containing retained aluminium boride particles separately from the bulk of the molten metal.

2. A method as claimed in claim 1, wherein the filter medium is selected from $TiB_2$, $AlB_2$, $AlB_{12}$, BN, TiN and AlN.

3. A method of producing a refractory composite containing titanium diboride, which method comprises providing a body of molten aluminium containing suspended particles of an aluminium boride, physically separating said suspended particles from the bulk of the molten metal by passing the body containing the suspended particles through a filter which is pervious to the molten aluminium but which retains the suspended particles, said filter being constituted of a filter medium comprising a nitride or boride of titanium, thereafter recovering the filter medium containing retained aluminium boride particles separately from the bulk of the molten metal, said recovered particle-containing filter medium constituting a mixture of titanium and aluminium compounds, and subjecting said mixture to reaction sintering to form a refractory composite containing titanium diboride.

4. A method as claimed in claim 3, wherein the subjecting step comprises adding, to said mixture, at least one compound selected from the class consisting of titanium and aluminium compounds which react therewith to form a refractory composite containing titanium diboride, and heating said mixture containing said one compound to effect reaction sintering thereof to form said composite.

5. A method of producing an aluminium boride in solid form, which method comprises providing a body of molten aluminium containing suspended particles of an aluminium boride, passing the body through a filter which is pervious to the molten aluminium but which retains the suspended particles, the filter medium being a refractory material not attacked by the molten aluminium or by the aluminium boride, dissolving the filter medium in an acid in which the aluminium boride is insoluble, and recovering the aluminium boride in solid form.

6. A method as claimed in claim 5, wherein the filter medium is alumina.

7. A method of producing an aluminium boride in solid form, which method comprises providing a body of molten aluminium containing suspended particles of an aluminium boride, passing the body through a filter which is pervious to the molten aluminium but which retains the suspended particles, the filter medium being carbon, converting the carbon filter medium to methane, and recovering the aluminium boride in solid form.

* * * * *